Sept. 9, 1958 R. H. KINGDON 2,850,916
ENCLOSURE AND OPERATING MEANS FOR ELECTRICAL
INSTRUMENTALITIES
Filed June 17, 1954 2 Sheets-Sheet 1

INVENTOR.
Ralph H. Kingdon.
BY
ATTORNEY.

Sept. 9, 1958 R. H. KINGDON 2,850,916
ENCLOSURE AND OPERATING MEANS FOR ELECTRICAL
INSTRUMENTALITIES
Filed June 17, 1954 2 Sheets—Sheet 2
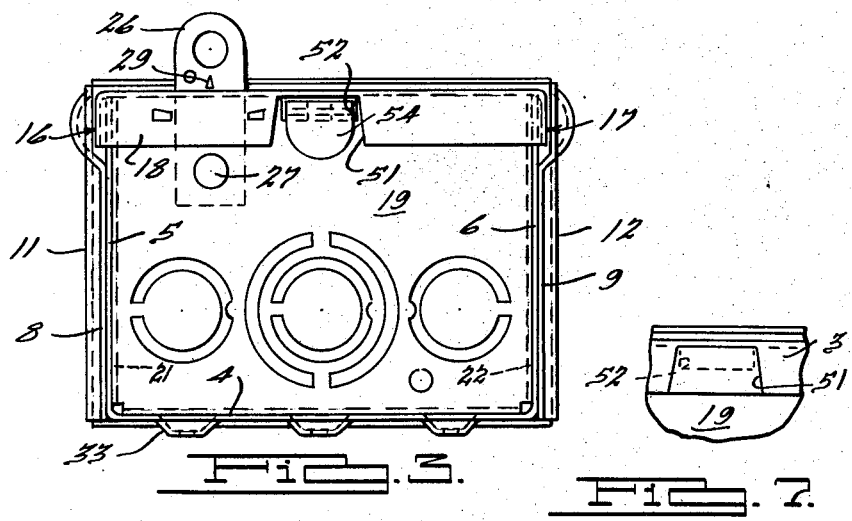
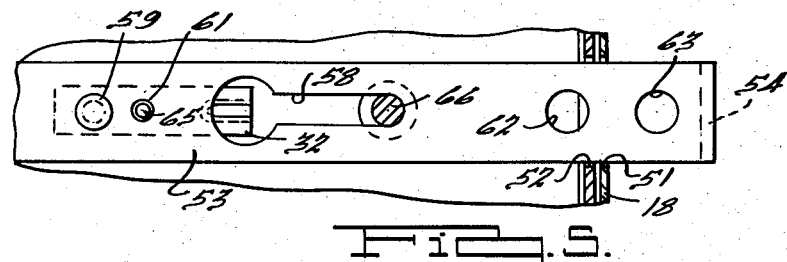
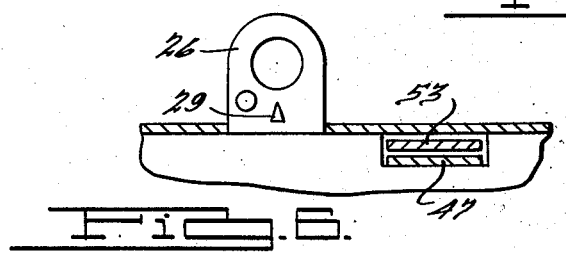
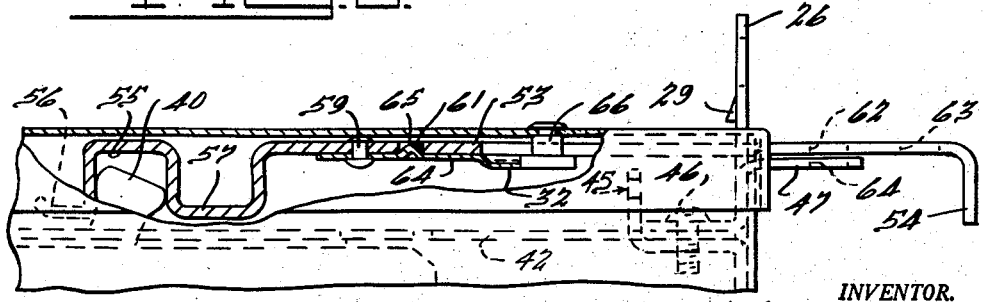
INVENTOR.
Ralph H. Kingdon.
BY
ATTORNEY.

United States Patent Office 2,850,916
Patented Sept. 9, 1958

2,850,916

ENCLOSURE AND OPERATING MEANS FOR ELECTRICAL INSTRUMENTALITIES

Ralph H. Kingdon, Birmingham, Mich., assignor to Square D Company, Detroit, Mich., a corporation of Michigan Application June 17, 1954, Serial No. 437,537

7 Claims. (Cl. 74—503)

This invention relates to enclosures for receiving electrical instrumentalities and has for an object the provision of improved enclosing means adapted to protect electrical instrumentalities from the elements and having an externally operable manipulating means.

Another object of the present invention is to provide an improved enclosure for enclosing and supporting an electrical instrumentality and which is provided with convenient external operating mechanism for operating the electrical instrumentality within the enclosure.

A further object of the present invention is to provide an enclosure for electrical instrumentalities for outdoor use provided with means for easily attaching an external operating mechanism.

Other objects and features of this invention will be readily apparent to those skilled in the art from the following specification and appended drawings illustrating certain preferred embodiments of the invention in which:

Figure 3 is an end elevational view of the enclosure of the present invention.

Figure 4 is an enlarged partial sectional view showing the support arrangement for the external operating mechanism.

Figure 5 is an enlarged partial sectional view of the enclosure of the present invention taken along the lines V—V of Figure 1.

Figure 6 is an enlarged partial sectional view of the external operating mechanism of the present invention taken along the lines VI—VI of Figure 1.

Figure 7 is a partial end elevational view showing the cover with twistout in place.

Figure 1:
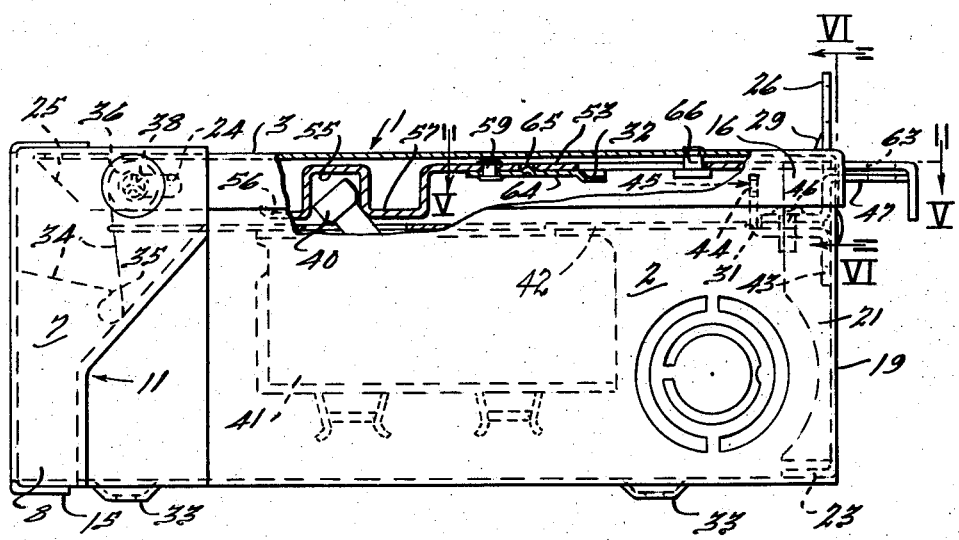
Figure 1 is a side elevational view of the enclosure according to the present invention with portions of the side and cover of the enclosure broken away to show internal portions of the external operating mechanism.

The enclosure 1 according to the present invention embodies a cabinet 2 and an upwardly swingable door or cover 3 mounted thereon. The cabinet portion 2 is formed from a U-shaped stamping having a bottom wall 4 and side walls 5 and 6. The cabinet portion 2 is completed by a flange top wall or cap 7 rigidly secured to the walls 4, 5 and 6 as by welding. The cap 7 is provided with side flanges 8 and 9, a portion of each of which is bent as at 11 and 12 to lie spaced from the side walls 5 and 6 of the cabinet 2 as seen in Figure 1. Bosses 13 and 14 are provided on the flanges 8 and 9 to provide operating space for the hinge mounting of the cover 3 as will be more fully described hereinafter. The cap 7 is further provided with a bottom flange 15 to which the back wall 4 of the cabinet portion 2 is secured as by welding.

The swingable cover 3 is provided with flanges at 16, 17 and 18 on the sides and end respectively thereof.

An end plate 19 is provided for the end of the cabinet portion 2 opposite to that end covered by cap 7, and this plate 19 is provided with side flanges 21 and 22 and a back flange 23. The end plate 19 fits within the back and side walls 4, 5 and 6 of the cabinet portion 2 and is rigidly secured thereto as by welding at flanges 21, 22 and 23. The swingable cover 3 is provided with elongated openings 24 in the side flanges 16 and 17 thereof near the end associated with the cap 7, and the ends of the side flanges 16 and 17 are cut off diagonally at 25 as shown in Figure 1 to provide a stop arrangement for the swingable door when in the open position, as will be more fully described hereinafter.

A stationary resilient latch 26 is secured to the end plate 19 as by rivet 27, shown in Figure 3, and a rectangular slot is cut through the swingable door 3 in cooperating relationship with latch 26 so that when the cover is in closed position the latch will extend through the slot in the door. A nose 29 is pressed from the latch 26 to engage the upper surface of the cover 3 when in closed position to latch the cover closed.

The ends of the side walls 5 and 6 of the cabinet portion 2 are cut out in an irregular contour as is shown in Figure 1 at 34 to provide a lock shoulder 35 for holding the cover 3 when in open position.

At the upper end of the side walls 5 and 6, near the cutout portion 34, a hole is provided through the walls in alignment with the elongated cutouts 24 in the side flanges 16 and 17 of the cover 3. Through holes in the side walls 5 and 6 and the elongated hole 24 in the side flanges 16 and 17 of the cover 3 pass headed hinge pins 36 and 37 having resilient shouldered legs 38 to support the cover 3 on the side walls 5 and 6 in a swingable fashion.

Figure 2:
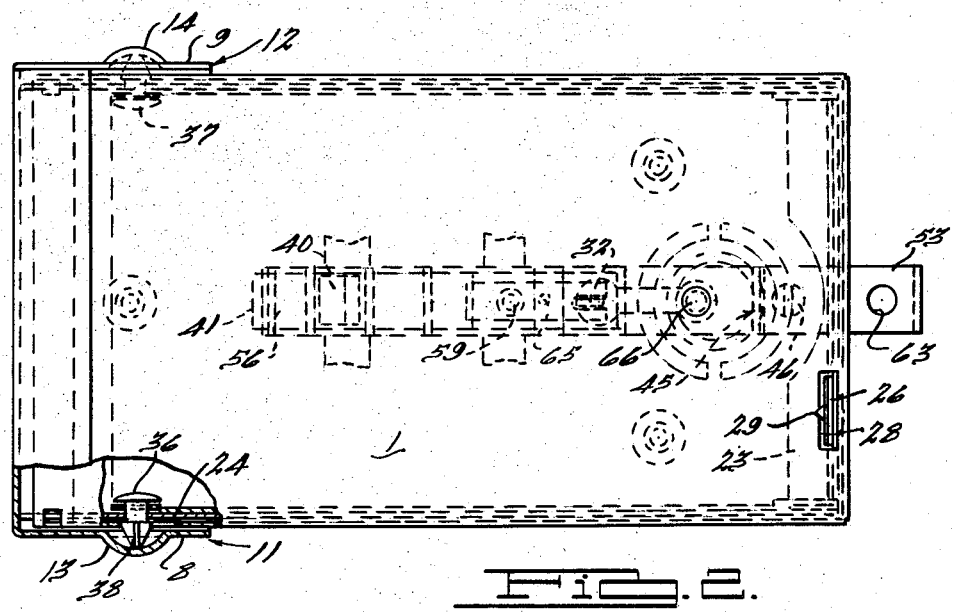
Figure 2 is a top view of the enclosure of the present invention with portions of the end cap and cover of the enclosure broken away to show the pivotal support for the cover.

In Figures 1 and 2 of the drawings, an electrical instrumentality 41 is shown in dotted lines in its supported position within the enclosure 1. Above the electrical instrumentality 41 and partially resting on the surface portion thereof is an internal cover plate 42 supported at one end on a flange 43 secured to the end plate 19 by suitable means such as welding. Internal cover plate 42 substantially entirely covers the interior of the enclosure preventing access to the electrical connections to the instrumentality 41 while providing access to its operating handle 40. The flange 43 is provided with a vertical extension 44 which passes through a suitable slot 31 in the internal cover 42 and the extension 44 is provided with a hole 45 through which a suitable locking device may be passed to lock the cover 42 against removal. The internal cover 42 is provided with a through hole, and the flange 43 is provided with a tapped hole into which a screw 46 may be threaded to secure the internal cover upon its supporting flange 43. Screw 46 also supports a bracket 47, when employed, as by passing through a suitable hole in one portion thereof to support the flange for a purpose to be more fully described hereinafter.

The enclosure 1 of the present invention is provided with an arrangement for adapting the device for external operation without opening of the hinged cover 3. To accommodate this mechanism, the end flange 18 of the cover 3 is provided with a removable twistout at 51 in alignment with a cutout notch 52 in the edge of end plate 19 to provide an opening through which external operating mechanism may pass for operation of the enclosed electrical instrumentality 41.

The cover 3 for the enclosure 1 when manufactured will be provided with the removable twistout at 51 and, when assembled with the remainder of the enclosure, will either retain the twistout or have it removed in accordance with the type of enclosure desired by a customer. The twistout may be left in place on the cover for removal at some later time when the enclosure is to be adapted for an external operator as will be described, or the external operator may be attached at the time of manufacture in which case the twistout will be removed during original assembly.

As best shown in Figures 1 and 4 of the drawings, the external operating mechanism of the present invention comprises a sheet metal strap 53 having an external bent over handle flange at 54 and having its internal end portion bent in serpentine fashion to provide a handle engagement cavity at 55 and cover closure prevention portions at 56 and 57. The external operating strap 53 is provided with a key-hole like cutout portion at 58, a pair of holes 59 and 61 on the internal portion of the strap, and the pair of holes 62 and 63 disposed near the external portions of the strap. Upon the under side of the internal portions of the strap 53, a resilient spring strip 64 is attached by a suitable rivet passing through hole 59. The resilient strip 64 is provided with a nib 65 in cooperating relationship with the hole 61 in the strap 53 to prevent rotation and at its free end is laterally pressed out along the end portion 32 thereof in cooperating association with the circular portion of the key-hole like cutout 58.

The external operating strap 53 is supported on the inside surface of the cover 3 on the head of a shouldered rivet 66 secured in the cover 3 by having its end peened over onto the external portion of the cover 3. The rivet 66 will be supplied on all covers whether originally supplied with external operators at the time of manufacture or sold as an enclosure without external operators. The head of the rivet 66 is small enough to pass through the circular portion of the key-hole like cutout 58 in the strap 53 and the shoulder portion of the rivet 66 is of a size to pass along the elongated slot portion of the key-hole like cutout 58 so that, as may be seen in Figure 5, the strap 53 will be guided by the rivet 66 and will slide on the inside surface of the head thereof. When the strap 53 is placed onto the rivet 66, the head of the rivet, as has been described, passes through the circular portion of the key-hole like cutout 58, the resilient strip 64 being bent about its riveted support on the strap 53 to permit the head of the rivet 66 to pass the thickness of the strap and permit longitudinal movement thereof. Once the strap 53 has been mounted on the rivet 66, the strap may not be removed therefrom until resilient strip 64 is manually bent out of its interfering relationship with the head of rivet 66 so as to permit the rivet to pass to the circular portion of the cutout 58.

It may now be seen that an enclosure of the type shown in the drawings originally sold without an external operator may be provided with such external operator after installation with ease. All that need be supplied to the user to adapt his present enclosure is the operating strap 53 and the bracket 47 which may be mounted on the cover 3 and internal cover 42, respectively. The twistout at 51 will have to be removed from the flange of the cover 3 to accommodate the strap 53 and this may be done conveniently with the aid of pliers or other suitable tools.

The innermost end of the external operating strap 53, as has been described, is bent in a serpentine fashion to provide an operating cavity at 55 and cover closure prevention portions at 56 and 57. The operating cavity 55, in normal operating procedure with the cover 3 closed, engages the operating handle 40 of the electrical instrumentality 41 supported within the enclosure 1. As can be seen from Figures 1 and 4, the operating handle 40 of the electrical instrumentality 41 will be moved to an "off" or "on" position with a pushing or pulling movement of the handle portion 54 of the operating strap 53. Cover closure prevention portions 56 and 57 are provided to engage the handle 40 of the instrumentality 41 should the handle be in a condition different from the condition of the strap 53; that is, after the cover 3 has been opened and is being moved to its closed position, should the handle on the instrumentality 41 be in an "on" position, as shown in Figure 1, and should the strap 53 be in the "off" position, as shown in Figure 4, portion 56 of the strap 53 will encounter the handle of the instrumentality 41 and prevent the continued movement of the cover 3 to its closed position. Should the handle of the instrumentality be in the "off" position and the strap 53 on the "on" position, portion 57 of the strap 53 will then engage the handle of the instrumentality and similarly prevent the cover 3 from moving to its closed position.

As has been previously described, a bracket 47 is mounted by screw 46 and has a flange extending through the cutout portions 51 and 52 into cooperating association with the external portions of the external operating strap 53. This flange is provided with a suitable hole at 64 to cooperate with the previously described holes 62 or 63 in the strap 53 to provide accommodation of a locking device which may pass through the holes to maintain the external operating strap in either its adjusted "on" or "off" position.

While certain preferred embodiments of the invention have been specifically disclosed, it is understood that the invention is not limited thereto, and is to be given its broadest possible interpretation within the terms of the following claims:

What is claimed is:

1. Enclosing means for an electrical instrumentality having manually movable operating means comprising a box-like enclosure, a cover pivotally mounted on said enclosure, a flange on said cover overlapping an edge of said enclosure, aligned cutout portions in said cover flange and enclosure edge, support means fixed to the inside surface of said cover, and an operating member slidably supported on said cover support means and having a portion thereof extending exteriorly of said enclosure through said cutout portions and having interior portions thereof engaging the operating means of said instrumentality whereby said operating member may be pivotally movable with said cover and reciprocable into and out of said enclosure along said support means and through said cutout portions.

2. Enclosing means for an electrical instrumentality having manually movable operating means comprising a box-like enclosure, a cover for said enclosure, a flange on said cover overlapping an edge of said enclosure, aligned cutout portions in said cover flange and enclosure edge, and operating mechanism slidably supported on the inside surface of said cover and having a portion thereof extending exteriorly of said enclosure through said aligned cutout portions and an interior portion thereof engageable with the operating means for said electrical instrumentality said operating means being pivotally movable with said cover and reciprocable into and out of said enclosure along said support means and through said cutout portions.

3. Enclosing means for an electrical instrumentality having manually movable operating means comprising a box-like enclosure, an openable cover for said enclosure, a flange on at least the bottom edge of said cover overlapping the bottom edge of the enclosure, aligned cutout portions in said bottom cover flange and bottom enclosure edge, a headed shoulder rivet fixed on the inside of said cover, and a manually operable strap slidably supported on said rivet and having a portion extending exteriorly of said enclosure through said cutout portions and a portion interior of said enclosure in operating engagement with said operating means of said electrical instrumentality whereby said instrumentality may be operated by said strap from a point exterior of said enclosure said operating means being pivotally movable with said cover and reciprocable into and out of said enclosure along said support means and through said cutout portions.

4. Enclosing means for an electrical instrumentality having manually movable operating means comprising a box-like enclosure, an openable cover for said enclosure, a flange on said cover overlapping an edge of the enclosure, aligned cutout portions in said cover flange and enclosure edge, a headed shoulder rivet fixed to the inside surface of said cover, and a sheet metal strap slidably supported on said headed rivet, said sheet metal strap being bent in a serpentine fashion interiorly of said enclosure and having a manually operated portion extending exteriorly of said enclosure through said cutout portions, said serpentine bent portions of said sheet metal strap providing an operating cavity engageable with said operating means of said electrical instrumentality and barrier portions preventing closure of said cover when said operating cavity is not in alignment with said operating means.

5. Enclosing means for an electrical instrumentality having a manually movable operating means adapted to be directly moved and indirectly moved by an elongated operator, selectively, and comprising a box-like enclosure, a cover for said enclosure, a flange on said cover overlapping an edge of said enclosure, said flange and edge being substantially at right angles to the plane of said cover, an open-sided cutout notch in the edge of said enclosure overlapped by said flange, a twistout in said cover flange in line with said notch which, when removed, provides access into said enclosure for the operator, and means on the interior surface of said cover for slidably supporting the operator.

6. Enclosing means for an electrical instrumentality having a manually movable operating means adapted to be directly moved and indirectly moved by an elongated operator, selectively, and comprising a box-like enclosure, a cover for said enclosure, a flange on said cover overlapping an edge of said enclosure, said flange and edge being substantially at right angles to the plane of said cover, an open-sided cutout notch in the edge of said enclosure overlapped by said flange, a twistout in said cover flange in line with said notch which, when removed, provides access into said enclosure for the operator, and means on the interior surface of said cover for slidably supporting the operator, said supporting means being aligned with said notch and twistout.

7. Enclosing means for an electrical instrumentality having manually movable operating means comprising a box-like enclosure, a cover pivotally mounted on said enclosure, said cover having a face surface and flange surfaces, said flange surfaces overlapping the edge of said enclosure, aligned cutout portions in one flange of said cover and the adjacent edge of said enclosure, support means on the inside of said face surface of said cover, and a sheet metal external operator for said enclosed electrical instrumentality slidably supported on said support means and passing through said aligned cutout portions, said external operator having serpentine folded portions within said enclosure for engagement with an operator of said enclosed electrical instrumentality.

References Cited in the file of this patent
UNITED STATES PATENTS

| | | |
|---|---|---|
| 1,306,191 | Platt | June 10, 1919 |
| 1,396,434 | Horton | Nov. 8, 1921 |
| 2,127,060 | Hansen | Aug. 16, 1938 |
| 2,260,025 | Hepperlen | Oct. 21, 1941 |
| 2,330,975 | Jackson | Oct. 5, 1943 |
| 2,354,224 | Stein | July 25, 1944 |
| 2,548,732 | Lippold | Apr. 10, 1951 |